United States Patent
Rubenstein et al.

(10) Patent No.: US 12,554,972 B2
(45) Date of Patent: Feb. 17, 2026

(54) PERFORMING TASKS USING GENERATIVE NEURAL NETWORKS

(71) Applicant: Google LLC, Mountain View, CA (US)

(72) Inventors: Paul Kishan Rubenstein, Zurich (CH); Matthew Sharifi, Kilchberg (CH); Alexandru Tudor, Uitikon (CH); Chulayuth Asawaroengchai, Zurich (CH); Duc Dung Nguyen, Zurich (CH); Marco Tagliasacchi, Ruvigliana (CH); Neil Zeghidour, Paris (FR); Zalán Borsos, Zurich (CH); Christian Frank, Zurich (CH); Dalia Salem Hassan Fahmy Elbadawy, Zurich (CH); Hannah Raphaelle Muckenhirn, Zurich (CH); Dirk Ryan Padfield, Seattle, WA (US); Damien Vincent, Zurich (CH); Evgeny Kharitonov, Paris (FR); Michelle Dana Tadmor, Tel Aviv (IL); Mihajlo Velimirovic, Zurich (CH); Feifan Chen, Seattle, WA (US); Victoria Zayats, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/750,973

(22) Filed: Jun. 21, 2024

(65) Prior Publication Data

US 2024/0428056 A1  Dec. 26, 2024

Related U.S. Application Data

(60) Provisional application No. 63/522,650, filed on Jun. 22, 2023.

(51) Int. Cl.
*G06N 3/0475* (2023.01)
*G10L 25/30* (2013.01)

(52) U.S. Cl.
CPC ........... *G06N 3/0475* (2023.01); *G10L 25/30* (2013.01)

(58) Field of Classification Search
CPC .. G06N 3/0475; G06N 3/0455; G06N 3/0464; G06N 3/088; G06N 3/09; G06N 3/096; G10L 25/30; G10L 15/16
See application file for complete search history.

(56) References Cited

U.S. PATENT DOCUMENTS

| | | | | |
|---|---|---|---|---|
| 2023/0255553 | A1* | 8/2023 | Weston | A61B 5/7264 600/586 |
| 2024/0282094 | A1* | 8/2024 | Tsimpoukelli | G06V 10/82 |

OTHER PUBLICATIONS

Wang et al., "VIOLA: Unified Codec Language Models for Speech Recognition, Synthesis, and Translation", May 25, 2023, arXiv: 2305.16107v1, pp. 1-11. (Year: 2023).*

(Continued)

*Primary Examiner* — Brent Johnston Hoover
(74) *Attorney, Agent, or Firm* — Fish & Richardson P.C.

(57) ABSTRACT

Methods, systems, and apparatus, including computer programs encoded on computer storage media, for performing tasks. One of the methods includes obtaining a sequence of input tokens, where each token is selected from a vocabulary of tokens that includes text tokens and audio tokens, and wherein the sequence of input tokens includes tokens that describe a task to be performed and data for performing the task; generating a sequence of embeddings by embedding each token in the sequence of input tokens in an embedding space; and processing the sequence of embeddings using a language model neural network to generate a sequence of output tokens for the task, where each token is selected from the vocabulary.

18 Claims, 5 Drawing Sheets

(56) References Cited

OTHER PUBLICATIONS

Borsos et al., "SoundStorm: Efficient Parallel Audio Generation", May 16, 2023, arXiv:2305.09636v1, pp. 1-9. (Year: 2023).*
Adiwardana et al., "Towards a human-like open-domain chatbot," CoRR, Submitted on Feb. 27, 2020, arXiv:2001.09977v3, 38 pages.
Agostinelli et al., "MusicLM: Generating music from text," CoRR, Submitted on Jan. 26, 2023, arXiv:2301.11325v1, 15 pages.
Alayrac et al., "Flamingo: a visual language model for few-shot learning," CoRR, Submitted on Nov. 15, 2022, arXiv: 2204.14198v2, 54 pages.
Anil et al., "PaLM 2 Technical Report," CoRR, Submitted on Sep. 13, 2023, arXiv:2305.10403v3, 93 pages.
Ardila et al., "Common voice: A massively-multilingual speech corpus, " Proceedings of the Twelfth Language Resources and Evaluation Conference, May 11-16, 2020, pp. 4218-4222.
Baevski et al., "wav2vec 2.0: A framework for self-supervised learning of speech representations," CoRR, Submitted on Oct. 22, 2020, arXiv: 2006.11477v3, 19 pages.
Bapna et al., "mSLAM: Massively multilingual joint pre-training for speech and text," CoRR, Submitted on Feb. 3, 2022, arXiv:2202.01374v1, 15 pages.
Barrault et al., "Findings of the 2019 conference on machine translation (WMT19)," Proceedings of the Fourth Conference on Machine Translation, Aug. 1-2, 2019, pp. 1-61.
Barrault et al., "Findings of the 2020 conference on machine translation (WMT20)," Proceedings of the Fifth Conference on Machine Translation, Nov. 19-20, 2020, pp. 1-55.
Bojar et al., "Findings of the 2013 Workshop on Statistical Machine Translation," Proceedings of the Eighth Workshop on Statistical Machine Translation, Aug. 8-9, 2013, pp. 1-44.
Bojar et al., "Findings of the 2015 Workshop on Statistical Machine Translation," Proceedings of the Tenth Workshop on Statistical Machine Translation, Sep. 17-18, 2015, pp. 1-46.
Bojar et al., "Findings of the 2017 Conference on Machine Translation (WMT17)," Proceedings of the Second Conference on Machine Translation, Sep. 7-11, 2017, 2:169-214.
Bojar et al., "Findings of the 2018 Conference on Machine Translation (WMT18)," Proceedings of the Third Conference on Machine Translation, Oct. 31-Nov. 1, 2018, 1:272-303.
Borsos et al., "AudioLM: a Language Modeling Approach to Audio Generation," CoRR, Submitted on 2022, arXiv: 2209.03143v1, 11 pages.
Borsos et al., "SoundStorm: Efficient parallel audio generation," CoRR, Submitted on May 16, 2023, arXiv:2305.09636v1, 9 pages.
Brown et al., "Language models are few-shot learners," CoRR, Submitted on Jul. 22, 2020, arXiv:2005.14165v4, 75 pages.
Chen et al., "Maestro: Matched speech text representations through modality matching," CoRR, Submitted in Jul. 1, 2022, arXiv:2204.03409v2, 5 pages.
Chen et al., "PaLI: A jointly-scaled multilingual language-image model," CoRR, Submitted on Sep. 16, 2022, arXiv:2209.06794v2, 30 pages.
Chen et al., "Uniter: Universal image-text representation learning," Computer Vision—European Conference on Computer Vision, 2020, pp. 104-120.
Chen et al., "WavLM: Large-scale self-supervised pre-training for full stack speech processing," CoRR, Submitted on Jan. 24, 2022, arXiv: 2110.13900v4, 13 pages.
Chiu et al., "Self-supervised learning with random-projection quantizer for speech recognition," CoRR, Submitted on Jun. 29, 2022, arXiv: 2202.01855v2, 10 pages.
Chowdhery et al., "PaLM: Scaling language modeling with pathways," CoRR, Submitted on Oct. 5, 2022, arXiv:2204.02311v5, 87 pages.
Chung et al., "W2V-Bert: Combining contrastive learning and masked language modeling for self-supervised speech pre-training," CoRR, Submitted on Sep. 13, 2021, 7 pages.

Conneau et al., "Fleurs: Few-shot learning evaluation of universal representations of speech," CoRR, Submitted on May 25, 2022, arXiv: 2205.12446v1, 10 pages.
Défossez et al., "High fidelity neural audio compression," CoRR, Submitted on Oct. 24, 2022, arXiv: 2210.13438v1, 19 pages.
Devlin et al., "Bert: Pre-training of deep bidirectional transformers for language understanding," CoRR, Submitted on Oct. 11, 2018, arXiv: 1810.04805v1, 14 pages.
Donahue et al., "Singsong: Generating musical accompaniments from singing," CoRR, Submitted on Jan. 30, 2023, arXiv: 2301.12662v1, 12 pages.
Fu et al., "VIOLET: End-to-end video-language transformers with masked visual-token modeling," CoRR, Submitted on Nov. 24, 2021, arXiv: 2111.12681v1, 19 pages.
Gales et al., "Low-resource speech recognition and keyword-spotting," Speech and Computer: 19th International Conference, 2017, pp. 3-19.
Gan et al., "Large-scale adversarial training for vision-and-language representation learning," CoRR, Submitted on Oct. 22, 2020, arXiv: 2006.06195v2, 16 pages.
Hassid et al., "Textually pretrained speech language models," CoRR, Submitted on Nov. 2, 2023, arXiv: 2305.13009v2, 19 pages.
Hoffmann et al., "Training compute-optimal large language models," CoRR, Submitted on Mar. 29, 2022, arXiv:2203.15556v1, 36 pages.
Hsu et al., "HuBERT: Self-supervised speech representation learning by masked prediction of hidden units," CoRR, Submitted on Jun. 14, 2021, arXiv: 2106.07447v1, 10 pages.
Jia et al., "CVSS corpus and massively multilingual speech-to-speech translation," CoRR, Submitted on Jun. 26, 2022, arXiv: 2201.03713v3, 13 pages.
Jia et al., "Direct speech-to-speech translation with a sequence-to-sequence model," CoRR, Submitted on Jun. 25, 2019, arXiv: 1904.06037v2, 5 pages.
Jia et al., "Leveraging unsupervised and weakly-supervised data to improve direct speech-to-speech translation," CoRR, Submitted on Mar. 24, 2022, arXiv: 2203.13339v1, 7 pages.
Jia et al., "Leveraging weakly supervised data to improve end-to-end speech-to-text translation," CoRR, Submitted on Feb. 10, 2019, arXiv: 1811.02050v2, 5 pages.
Jia et al., "PnG BERT: Augmented bert on phonemes and graphemes for neural TTS," Corr, Submitted on Jun. 7, 2021, arXiv: 2103.15060v3, 5 pages.
Jia et al., "Translatotron 2: High-quality direct speech-to-speech translation with voice preservation," International Conference on Machine Learning, May 17, 2022, pp. 10120-10134.
Kharitonov et al., "Speak, read and prompt: High-fidelity text-to-speech with minimal supervision," CoRR, Submitted on Feb. 7, 2023, arXiv: 2302.03540v1, 19 pages.
Kreuk et al., "Audiogen: Textually guided audio generation," CoRR, Submitted on Sep. 30, 2022, arXiv: 2209.15352v1, 15 pages.
Kudo et al., "Sentencepiece: A simple and language independent subword tokenizer and detokenizer for neural text processing," CoRR, Submitted on Aug. 19, 2018, arXiv: 1808.06226v1, 6 pages.
Kudo et al., "SentencePiece: A simple and language independent subword tokenizer and detokenizer for neural text processing," Proceedings of the 2018 Conference on Empirical Methods in Natural Language Processing: System Demonstrations, Oct. 31-Nov. 4, 2018, pp. 66-71.
Lakhotia et al., "On generative spoken language modeling from raw audio," Transactions of the Association for Computational Linguistics, Dec. 2021, 9:1336-1354.
Lavie et al., "JANUS-III: Speech-to-speech translation in multiple languages," International Conference on Acoustics, Speech, and Signal Processing, 1997, 5 pages.
Lee et al., "Direct speech-to-speech translation with discrete units," Proceedings of the 60th Annual Meeting of the Association for Computational Linguistics, May 22-27, 2022, 1:3327-3339.
Lee et al., "Textless speech-to-speech translation on real data," CoRR, Submitted on Dec. 15, 2021, arXiv: 2112.08352v1, 13 pages.
Ma et al., "Direct simultaneous speech to speech translation," CoRR, Submitted on Oct. 15, 2021, arXiv: 2110.08250v1, 6 pages.

(56) References Cited

OTHER PUBLICATIONS

Nakamura et al., "The ATR multilingual speech-to-speech translation system," IEEE Transactions on Audio, Speech, and Language Processing, Mar. 2006, 14(2): 365-376.
Oord et al., "Representation learning with contrastive predictive coding," CoRR, Submitted on Jul. 10, 2018, arXiv: 1807.03748v1, 13 pages.
Papineni et al., "Bleu: a method for automatic evaluation of machine translation," Proceedings of the 40th Annual Meeting of the Association for Computational Linguistics, Jul. 2002, pp. 311-318.
Post, "A call for clarity in reporting BLEU scores," Proceedings of the Third Conference on Machine Translation: Research Papers, Oct. 31-Nov. 1, 2018, 1:186-191.
Pratap et al., "MLS: A large-scale multilingual dataset for speech research," CoRR, Submitted on Dec. 19, 2020, arXiv:2012.03411v2, 10 pages.
Qi et al., "When and why are pre-trained word embeddings useful for neural machine translation?," Proceedings of the 2018 Conference of the North American Chapter of the Association for Computational Linguistics: Human Language Technologies, Jun. 1-6, 2018, pp. 529-535.
Radford et al., "Learning transferable visual models from natural language supervision," CoRR, Submitted on Feb. 26, 2021, arXiv: 2103.00020v1, 48 pages.
Radford et al., "Robust speech recognition via large-scale weak supervision," CoRR, Submitted on Dec. 6, 2022, arXiv: 2212.04356v1, 28 pages.
Rae et al., "Scaling language models: Methods, analysis & insights from training gopher," CoRR, Submitted on Dec. 8, 2021, arXiv: 2112.11446v1, 118 pages.
Raffel et al., "Exploring the limits of transfer learning with a unified text-to-text transformer," CoRR, Submitted on Oct. 24, 2019, arXiv:1910.10683v2, 53 pages.
Reddy et al., "DNSMOS: A non-intrusive perceptual objective speech quality metric to evaluate noise suppressors," IEEE International Conference on Acoustics, Speech and Signal Processing (DNSMOS), Feb. 10, 2021, 5 pages.
Roberts et al., "Scaling up models and data with t5x and seqio," Journal of Machine Learning Research, Nov. 2023, 24:1-8.
Sennrich et al., "Improving neural machine translation models with monolingual data," Proceedings of the 54th Annual Meeting of the Association for Computational Linguistics, Aug. 7-12, 2016, pp. 86-96.
Shi et al., "Learning audio-visual speech representation by masked multimodal cluster prediction," CoRR, Submitted on Mar. 13, 2022, arXiv: 2201.02184v2, 24 pages.
Tjandra et al., "Speech-to-speech translation between untranscribed unknown languages," CoRR, Submitted ono Oct. 5, 2019, arXiv: 1910.00795v2, 8 pages.
Vaswani et al., "Attention is all you need," Advances in Neural Information Processing Systems (NeurIPS), 2017, pp. 5998-6008.
Wang et al., "CoVoST 2: A massively multilingual speech-to-text translation corpus," CoRR, Submitted on Oct. 24, 2020, arXiv: 2007.10310v3, 6 pages.
Wang et al., "Neural codec language models are zero-shot text to speech synthesizers," CoRR, Submitted on Jan. 5, 2023, arXiv:2301.02111v1, 16 pages.
Wang et al., "OFA: Unifying architectures, tasks, and modalities through a simple sequence-to-sequence learning framework," Proceedings of the 39th International Conference on Machine Learning (PMLR), 2022, pp. 23318-23340.
Wang et al., "VoxPopuli: A large-scale multilingual speech corpus for representation learning, semi-supervised learning and interpretation," Proceedings of the 59th Annual Meeting of the Association for Computational Linguistics and the 11th International Joint Conference on Natural Language Processing, Aug. 1-6, 2021, pp. 993-1003.
Wei et al., "Chain of thought prompting elicits reasoning in large language models," CoRR, Submitted in Jan. 28, 2022, arXiv: 2201.11903v1, 24 pages.
Wei et al., "Joint pre-training with speech and bilingual text for direct speech to speech translation," CoRR, Submitted on Oct. 31, 2022, arXiv: 2210.17027v1, 5 pages.
Yu et al., "CoCa: Contrastive captioners are image-text foundation models," CoRR, Submitted on May 4, 2022, arXiv: 2205.01917v1, 19 pages.
Yu et al., "Scaling autoregressive models for content-rich text-to-image generation," CoRR, Submitted on Jun. 22, 2022, arXiv: 2206.10789v1, 49 pages.
Yuan et al., "Florence: A new foundation model for computer vision," CoRR, Submitted on Nov. 22, 2021, arXiv: 2111.11432v1, 17 pages.
Zeghidour et al., "SoundStream: An end-to-end neural audio codec," CoRR, Submitted on Jul. 7, 2021, arXiv: 2107.03312v1, 12 pages.
Zhang et al, "Google USM: Scaling automatic speech recognition beyond 100 languages, " CoRR, Submitted on Sep. 25, 2023, arXiv:2303.01037v3, 20 pages.
Zhang et al., "Speak foreign languages with your own voice: Cross-lingual neural codec language modeling," CoRR, Submitted on Mar. 7, 2023, arXiv: 2303.03926v1, 17 pages.
Zhang et al., "UWSpeech: Speech to speech translation for unwritten languages," The Thirty-Fifth AAAI Conference on Artificial Intelligence, 2021, pp. 14319-14327.
Borsos et al., "AudioPaLM: A Large Language Model That Can Speak and Listen," CoRR, Submitted on Sep. 7, 2022, arXiv:2209.303143v1, pp. 1-11.
International Search Report and Written Opinion in International Appln. No. PCT/US2024/035049, mailed on Oct. 22, 2024, 16 pages.
Zhang et al., "SpeechGPT: Empowering Large Language Models with Intrinsic Cross-Modal Conversational Abilities," CoRR, Submitted on May 18, 2023, arXiv:2305.11000v1, pp. 1-13.

\* cited by examiner

| Model | CoVoST2 AST BLEU↑ | CVSS S2ST ASR-BLEU↑ | VoxPopuli ASR WER↓ |
|---|---|---|---|
| Whisper Large-v2 1.5B [Radford et al., 2022] | 29.1 | — | 13.6 |
| mSLAM-CTC 2B [Bapna et al., 2022] | 25.2 | — | 9.1 |
| MAESTRO 600M [Chen et al., 2022c] | 25.2 | — | 8.1 |
| USM-M [Zhang et al., 2023a] | 30.7 | — | — |
| Translatotron 2 + pretraining + TTS aug [Jia et al., 2022a] | — | 25.6 | — |
| AudioPaLM 8B AST (ours) | 35.4 | — | 11.1 |
| AudioPaLM 8B S2ST (ours) | 36.2 | 32.5 | 16.0 |
| AudioPaLM-2 8B AST (ours) | 37.8 | — | 9.8 |
| AudioPaLM-2 8B cascaded ASR + transl. (ours) | 39.0 | — | — |

FIG. 5

PERFORMING TASKS USING GENERATIVE NEURAL NETWORKS

CROSS-REFERENCE TO RELATED APPLICATION

This application claims priority to U.S. Provisional Application No. 63/522,650, filed on Jun. 22, 2023. The disclosure of the prior application is considered part of and is incorporated by reference in the disclosure of this application.

BACKGROUND

This specification relates to performing tasks using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current value inputs of a respective set of parameters.

SUMMARY

This specification describes a system implemented as computer programs on one or more computers in one or more locations that performs tasks using one or more generative neural networks. For example, the tasks can include generating text, generating an audio signal, or generating both text and an audio signal.

Generally, the audio signal includes a sample of an audio wave at each of a sequence of time steps that span a specified time window. For example, the time steps can be arranged at regular intervals within the specified time window. The audio sample at a given time step can be an amplitude value of the audio wave or an amplitude value that has been compressed, companded, or both. For example, the audio sample can be a raw amplitude value or a mu-law companded representation of the amplitude value.

In general, one innovative aspect of the subject matter described in this specification can be embodied in methods that include the actions of obtaining a sequence of input tokens, where each token is selected from a vocabulary of tokens that includes text tokens and audio tokens, and wherein the sequence of input tokens includes tokens that describe a task to be performed and data for performing the task; generating a sequence of embeddings by embedding each token in the sequence of input tokens in an embedding space; and processing the sequence of embeddings using a language model neural network to generate a sequence of output tokens for the task, where each token is selected from the vocabulary.

In some implementations, generating a sequence of embeddings by embedding each token in the sequence of input tokens in an embedding space comprises: maintaining a respective embedding for each token in the vocabulary of tokens; and for each token in the sequence of input tokens, mapping the token to the respective embedding for the token.

In some implementations, processing the sequence of embeddings using a language model neural network to generate a sequence of output tokens for the task comprises processing the sequence of embeddings using a language model neural network to autoregressively generate a sequence of output tokens for the task.

In some implementations, the embeddings for any text tokens in the vocabulary have been learned during text-only pre-training of the language model neural network, wherein the embeddings for any audio tokens in the vocabulary have been learned during audio-text training of the language model neural network, and wherein the embeddings for the text tokens are held fixed during the audio-text training of the language model neural network.

In some implementations, obtaining a sequence of input tokens comprises: receiving an input text tag that describes the task to be performed; receiving one or more sequences of data for performing the task; and generating a sequence of input tokens from the input text tag and the one or more sequences of data.

In some implementations, the one or more sequences of data comprises text, and wherein generating a sequence of input tokens comprises: applying a text tokenizer to the text to generate a sequence of text tokens; and including the sequence of text tokens in the sequence of input tokens.

In some implementations, the one or more sequences of data comprises an audio signal, and wherein generating a sequence of input tokens comprises: applying an audio tokenizer to the audio signal to generate a sequence of audio tokens; and including the sequence of audio tokens in the sequence of input tokens.

In some implementations, applying an audio tokenizer to the audio signal comprises: generating a semantic representation of the audio signal that specifies a respective audio token at each of a plurality of first time steps spanning the audio signal, each audio token being selected from a vocabulary of audio tokens and representing semantic content of the audio signal at the corresponding first time step.

In some implementations, generating a semantic representation of the audio signal comprises: processing the audio signal using an audio representation neural network that has been trained to generate representations of input audio to generate the semantic representation of the audio signal.

In some implementations, processing the audio signal using an audio representation neural network that has been trained to generate representations of input audio to generate the semantic representation of the audio signal comprises: processing the audio signal using the audio representation neural network to generate a respective encoded vector for each of the first time steps; and for each first time step, selecting, as the audio token at the first time step, the audio token that is closest to the encoded vector generated by the audio representation neural network for the first time step.

In some implementations, generating a sequence of input tokens comprises: applying a text tokenizer to the input text tag to generate a sequence of text tokens; and including the sequence of text tokens in the sequence of input tokens.

In some implementations, the method further comprises detokenizing the sequence of output tokens to generate an output that satisfies the task.

In some implementations, the output for the task comprises text, an audio signal, or both.

In some implementations, the sequence of output tokens comprises a plurality of text tokens, and wherein detokenizing the sequence of output tokens comprises: processing the text tokens to generate a prediction of text.

In some implementations, the sequence of output tokens comprises a plurality of audio tokens, and wherein detokenizing the sequence of output tokens comprises: generating, using one or more neural networks and conditioned on at least the plurality of audio tokens, an acoustic representation of an audio signal, the acoustic representation specifying a set of one or more respective acoustic tokens at each of a plurality of second time steps spanning the audio signal, the one or more respective acoustic tokens at each second time step representing acoustic properties of the audio signal at the corresponding second time step; and processing at least the acoustic representation using a decoder neural network to generate a prediction of an audio signal.

In some implementations, generating the acoustic representation comprises generating the acoustic representation conditioned on the plurality of audio tokens and a voice context to generate the acoustic representation of the audio signal, and wherein processing at least the acoustic representation using a decoder neural network comprises processing the acoustic representation of the audio signal and an acoustic representation of the voice context using a decoder neural network to generate a prediction of the audio signal conditioned on the voice context.

In some implementations, the voice context comprises a respective audio token at each of a plurality of first time steps spanning at least part of an audio signal, each audio token being selected from a vocabulary of audio tokens and representing semantic content of the audio signal at the corresponding first time step.

In some implementations, the task comprises one or more of: automatic speech recognition, automatic speech translation, speech to speech translation, text to speech, or text to text machine translation.

In some implementations, the task comprises a plurality of subtasks, and wherein the input text tag specifies each of the subtasks, and wherein the sequence of output tokens includes a respective output for each of the subtasks.

In some implementations, a subtask comprises any one of: automatic speech recognition, automatic speech translation, speech to speech translation, text to speech, or text to text machine translation.

In some implementations, the language model neural network is trained on one or more tasks.

Other embodiments of this aspect include corresponding computer systems, apparatus, and computer programs recorded on one or more computer storage devices, each configured to perform the actions of the methods.

The subject matter described in this specification can be implemented in particular embodiments so as to realize one or more of the following advantages.

The system described in this specification is a multimodal architecture that can process and generate text and speech. The system can include a large language model neural network and an audio framework for generating audio. For example, the system can use a joint vocabulary that represents speech and text. A single decoder-only model can be trained to perform multiple tasks or combinations of tasks that involve arbitrarily interleaved speech and text. For example, the system can obtain a sequence of input tokens that include text tokens, audio tokens, or both text and audio tokens, selected from a vocabulary of text tokens and audio tokens. The system can generate a sequence of embeddings by embedding each token in an embedding space. The system can process the sequence of embeddings using the language model neural network to generate a sequence of output tokens, where each token is selected from the vocabulary.

For example, speech recognition, text-to-speech synthesis, and speech to speech translation are special cases of tasks that involve speech and text. As an example, the system can generate speech, text, or both, from input data that preserves paralinguistic information such as speaker identity and intonation. For example, to perform a task, the system obtains a sequence of input tokens that includes tokens describing a task to be performed and data for performing the task. In examples where the data for performing the task is an audio signal input, the system can generate the tokens describing data for performing the task using an audio tokenizer that generates audio tokens that preserve the paralinguistic information from the audio signal input. The system can generate a sequence of embeddings by embedding each token in an embedding space. The system can process the sequence of embeddings using a language model neural network to generate a sequence of output tokens, where each token is selected from the vocabulary. Thus the output tokens can include audio tokens that preserve the paralinguistic information from the audio signal input.

The system can also generate speech, text, or both, from input data that preserves linguistic knowledge of the input data. For example, to perform a task, the system obtains a sequence of input tokens that includes tokens describing a task to be performed and data for performing the task. In examples where the data for performing the task includes an audio signal input representing speech, the system can generate the tokens describing data for performing the task using an audio tokenizer that generates audio tokens that preserve linguistic information from the audio signal input. In examples where the data for performing the task includes text, the system can generate the tokens describing data for performing the task using a text tokenizer that generates text tokens that preserve linguistic information from the text.

Typically, conventional systems use heterogeneous models to perform different tasks. The system described in this specification, on the other hand, can be trained to perform a variety of tasks, using a single architecture and training run, saving computational resources required for training and inference. For example, the system can express different tasks with textual tags. In some examples, to perform a task, the system obtains a sequence of input tokens that includes tokens describing a task to be performed and data for performing the task. The system can generate the tokens describing the task by applying a text tokenizer to the textual tag for the task. The system can be trained on training data that includes input text tags specifying the task for the training example.

The system described in this specification can include an existing text-only language model neural network, without having to train the language model neural network from scratch, reducing the computing time and resources needed for training. For example, the language model neural network can be initialized with the weights of a text-only language model neural network. The system can obtain data specifying the pre-trained text-only language model neural network. The system can expand the embeddings matrix of the pre-trained language model neural network to include mappings for audio tokens. The system can further train, e.g., fine-tune, the language model neural network, including the embeddings matrix, from the pre-trained values. The system can thus leverage the existing language model neural network to make training faster and more efficient.

The system can also leverage the larger quantity of text training data available to assist with the speech or text-related tasks and improve model performance. Because there is a large quantity of text training data available relative to speech data, the system can use the linguistic and reasoning knowledge learned by the language model neural network when performing speech related tasks. The system can leverage the larger quantity of text training data to improve model performance on audio/speech related tasks by using a pre-trained text-only language model neural network as a starting basis for the model.

The language model neural network has better performance than existing systems on tasks such as speech translation and tasks such as zero-shot speech-to-text translation for languages for which input/target language combinations were not seen in training. By using a pre-trained language model neural network that has been trained on a large quantity of text training data, the system can leverage the translation capabilities of the pre-trained language model neural network.

The system has better performance, e.g., generates audio of high quality, and in some examples, truthfully preserves the voice of the speaker, on tasks such as speech to speech translation with voice transfer of unseen speakers compared to conventional systems. Conventional speech to speech translation systems are typically composed of a cascade of automatic speech recognition, text-to-text machine translation, and text-to-speech synthesis. However, cascade approaches primarily focus on the text and may overlook important aspects such as paralinguistic features, computational efficiency, compound errors, and the accurate handling of proper names, nouns, and non-verbal communication that do not require translation. The system described in this surpasses conventional methods in terms of speech quality and voice preservation by directly generating audio in the target language from audio in the source language. For example, the system can obtain a sequence of input tokens that include text tokens, audio tokens, or both text and audio tokens, selected from a vocabulary of text tokens and audio tokens. The system can generate a sequence of embeddings by embedding each token in an embedding space. The system can process the sequence of embeddings using the language model neural network to generate a sequence of output tokens, where each token is selected from the vocabulary. For speech to speech translation, each output token selected from the vocabulary can be an audio token. The system can thus perform speech to speech translation using only the language model neural network.

In some examples, the system can be requested to carry out a plurality of tasks or subtasks. For example, the system can be requested to perform speech to speech translation by performing subtasks such as automatic speech recognition, automatic speech translation, and speech to speech translation. The system performs the subtasks as a single autoregressive decoding (i.e., producing a single sequential output one token at a time, the output sequence including the output of all tasks/subtasks), which allows the model to attend to the input and all prior decoded content at each stage or subtask, as opposed to a separate pipeline approach. For example, the system can be trained to perform subtasks by being trained on training examples that include an input text tag that identifies subtasks for a task. The training output of each training example can include an output for each subtask so that the language model neural network is trained to generate a sequence of output tokens that includes output tokens for each subtask.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 shows the performance of an example system for performing tasks that require generating text, generating audio, or both.

Like reference numbers and designations in the various drawings indicate like elements.

DETAILED DESCRIPTION

Figure 1:
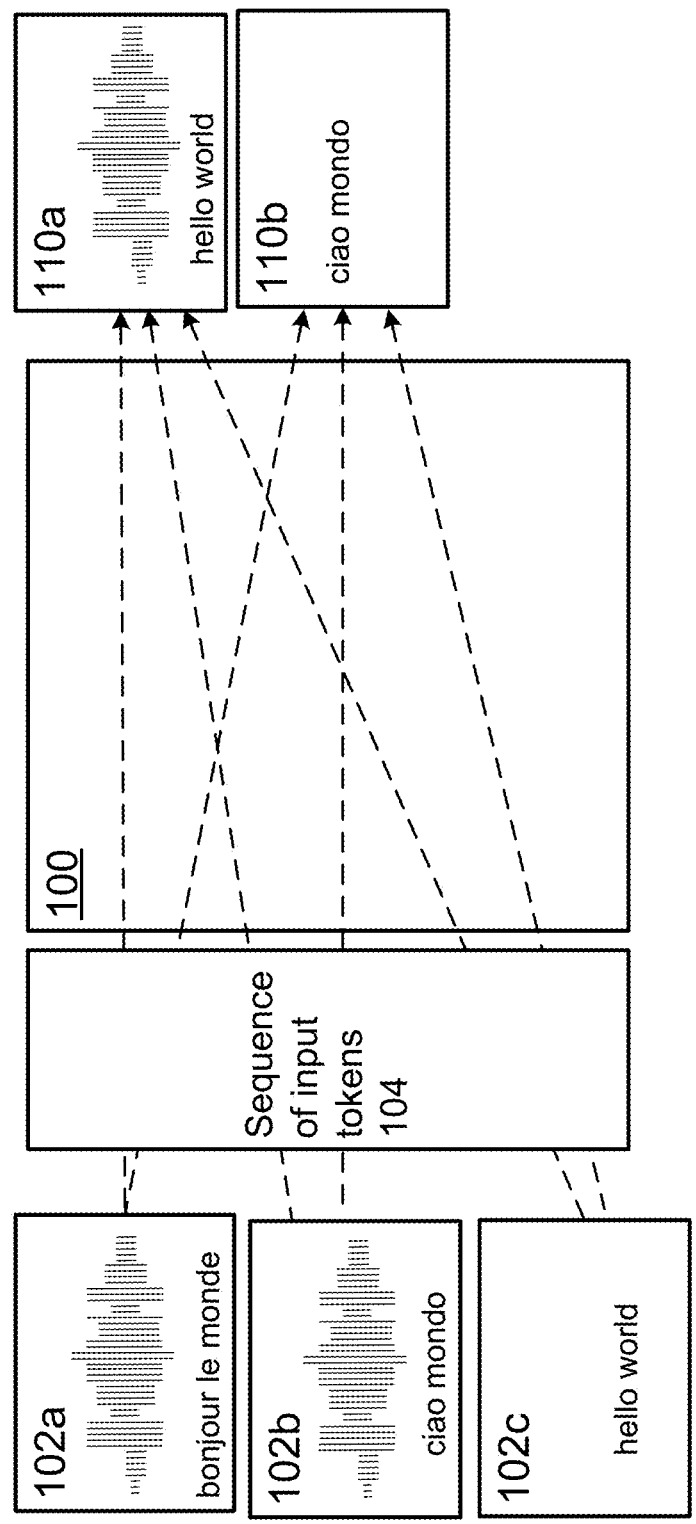
FIG. 1 is a block diagram of an example system for performing tasks that require generating text, generating audio, or both.

FIG. 1 is a block diagram of an example system 100 for performing tasks that require generating text, generating audio, or both. The system 100 is an example of a system implemented as computer programs on one or more computers in one or more locations in which the systems, components, and techniques described below are implemented.

The system 100 can perform tasks that require generating text, generating audio, or both, given a sequence of input tokens 104. The system 100 can be configured to perform any of a variety of tasks that require (i) receiving an input that includes both text and an audio signal, (ii) generating an output that includes an audio signal, or (iii) require both receiving an input that includes an audio signal and generating an output that includes an audio signal. Some examples of such tasks are described below. In some examples, the input or output can include arbitrarily interleaved speech and text.

To generate text or audio, the system obtains the sequence of input tokens 104. The sequence of input tokens 104 can include tokens that describe a task to be performed and data for performing the task (e.g., the input data for the task). For example, some tokens can correspond to an input text tag that is indicative of or describes the task to be performed.

Some tokens of the sequence of input tokens 104 can correspond to one or more sequences of data 102 for performing the task. The sequence of data can include text or an audio signal, for example. For example, some tokens of the sequence of input tokens 104 can correspond to the text of the sequence of data. Some tokens of the sequence of input tokens 104 can correspond to the audio signal of the sequence of data. The system can obtain text tokens or audio tokens that are selected from a vocabulary of text tokens and audio tokens.

FIG. 1 shows multiple sequences of data 102 that can be represented by tokens in an input to the system 100. For example, the system 100 receives audio signals such as an audio signal 102a, which represents speech for "bonjour le monde", and an audio signal 102b, which represents speech for "ciao mondo". The system 100 can also receive text such as the text 102c, which includes "hello world". In the example of FIG. 1, "bonjour le monde" is the French translation of "hello world," and "ciao mondo" is the Italian translation of "hello world."

In some implementations, the system 100 can generate the sequence of input tokens 104. The system 100 can receive an input text tag that describes the task to be performed, and one or more sequences of data 102 for performing the task. The system 100 can generate a sequence of input tokens from the input text tag and the one or more sequences of data 102. The one or more sequences of data 102 can include text or an audio signal. Thus, the sequence of input tokens 104 can be generated from data from multiple modalities. Generating the sequence of input tokens 104 is described in further detail below with reference to FIG. 2.

In some examples, the system 100 receives the input text tag and the one or more sequences of data 102 for performing the task from a user. For example, the system 100 can receive the input text tag and the one or more sequences of data 102 from a user through a user interface of a user device.

The system 100 processes the sequence of input tokens 104 using a language model neural network to generate an output 110 that satisfies the task. The output 110 for the task can include text, an audio signal, or both. Different tasks can cause the language model neural network to generate different types of output tokens that the system processes to generate the output 110. The output 110 for the task is defined by the sequence of input tokens 104. For example, the language model neural network can generate different types of output tokens, e.g., audio tokens or text tokens, according to the tokens of the sequence of input tokens 104 that describe the task to be performed and data for performing the task.

FIG. 1 shows an example output, audio signal 110a, that represents speech for "hello world". FIG. 1 also shows an example output, text 110b, which includes "ciao mondo". Generating the output 110 is described in further detail below with reference to FIG. 2. Generally, the output 110 generated by the system 100 satisfies a task such as automatic speech recognition (ASR), automatic speech translation (AST), speech to speech translation (S2ST), text to speech (TTS), or text to text machine translation (MT). In other words, the system 100 can perform any appropriate task that is specified by the input text tag. Example input text tags are described in further detail below with reference to FIG. 2.

For example, the system 100 can perform automatic speech recognition. The system 100 can receive an audio signal as input and generate text as an output. The audio signal can be a speech signal and the text can include a transcript of the content of the speech signal. In the example of FIG. 1, the system 100 can receive the audio signal 102b, which represents speech for "ciao mondo", and generate the text 110b as output, which includes the text "ciao mondo". In some examples, the system can receive an input text tag that specifies the task as automatic speech recognition.

As another example, the system 100 can also perform automatic speech translation. The system 100 can receive an audio signal as input and generate text as an output. The audio signal can be a speech signal and the text can include a translated transcript of the content of the speech signal in a different language than was included in the speech signal. In the example of FIG. 1, the system 100 can perform automatic speech translation from French to Italian. For example, the system can receive the audio signal 102a, which represents speech for "bonjour le monde", and generate the text 110b as output, which includes the text "ciao mondo". In some examples, the system can receive an input text tag that specifies the task as automatic speech translation and the target language, Italian. In some examples, the input text tag can also specify the source language, French. The system 100 can carry out the translation directly, that is, without needing to convert the audio signal to text and then translating the text separately.

As another example, the system 100 can perform speech to speech translation. The system 100 can receive an audio signal as input and generate an audio signal as an output. The input audio signal can be a speech signal and the output audio signal can include the same semantic content as the speech signal but spoken differently. For example, the input audio signal can include speech in one natural language and the output audio signal can represent speech in a target, different natural language that is a translation of the input speech into the target language. In the example of FIG. 1, the system 100 can perform speech to speech translation from French to English. For example, the system can receive the audio signal 102a, which represents speech for "bonjour le monde", and generate the audio signal 110a as output, which represents speech for "hello world". In some examples, the system can receive an input text tag that specifies the task as speech to speech translation and the target language, English. In some examples, the input text tag can also specify the source language, French. The system 100 can carry out the translation directly on the audio data, that is, without needing to convert the audio signal to text, translating the text and generating speech from the translated text in separate steps.

As another example, the system 100 can perform speech to speech translation from Italian to English. For example, the system can receive the audio signal 102b, which represents speech for "ciao mondo", and generate the audio signal 110a as output, which represents speech for "hello world". In some examples, the system can receive an input text tag that specifies the task as speech to speech translation and the target language, English. In some examples, the input text tag can also specify the source language, Italian.

As another example, the system 100 can perform text to speech generation. The system 100 can receive text as input and generate an audio signal as an output. The output audio signal can be a speech signal of the text, that is, the output audio signal can include spoken utterances corresponding to the input text. In the example of FIG. 1, the system 100 can receive the text 102c, which includes the text "hello world", and generate the audio signal 110a as output, which represents speech for "hello world". In some examples, the system can receive an input text tag that specifies the task as text to speech.

In addition to the tasks described above, the system 100 can also perform text to text tasks that do not require the input or output of audio. For example, the system can perform text to text machine translation. The system can receive text as input and generate text as an output. The output text can include text that is a translation of the input text into a target language. In the example of FIG. 1, the system 100 can perform machine translation from English to Italian. For example, the system 100 can receive the text 102c, which includes the text "hello world", and generate the text 110b as output, which includes the text "ciao mondo". In some examples, the system can receive an input text tag that specifies the task as machine translation and the target language, Italian. In some examples, the input text tag can also specify the source language, English. Thus, with different input text tags that specify different tasks, the system can perform both uni-modal tasks such as text to text machine translation, as well as multimodal tasks.

In some implementations, the system 100 can perform a combination of tasks. For example, a task can include multiple subtasks and the system 100 can perform the combination of subtasks. For convenience, an individual task in a combination of tasks may also be referred to as a subtask. The input text tag can identify the subtasks to be carried out. The sequence of output tokens can include a respective output for each of the subtasks. Thus, in some examples, the system 100 can output intermediate steps for a complex task.

As an example, the system 100 can perform speech to speech translation to directly output an audio signal in French from an input audio signal in English when the input tag text specifies a single task of speech to speech translation. Alternatively, the system 100 can output English text, followed by French text, followed by an audio signal in French. For example, the input text tag can specify the combination of subtasks of automatic speech recognition, automatic speech translation, and speech to speech translation. The system 100 can perform the combination of subtasks with a single call to the language model neural network, rather than multiple separate calls to the language model neural network. The language model neural network can attend to the input and all prior decoded content at each stage, resulting in improved performance compared to a pipeline approach of performing automatic speech recognition, machine translation, and text to speech. In this example, the system 100 carries out all of the subtasks using the provided input audio whereas in a pipeline approach, the input audio is processed only by the automatic speech recognition system. The output of the automatic speech recognition system, i.e., a text transcript of the audio is fed into the machine translation system which provides a translation of the text transcript. The translated transcript is fed into the text to speech system to generate the translated audio. However, prosodic and para-linguistic information that is present in the input audio is not carried through to the text to speech system in the pipelined process. By comparison, in the system 100, when generating the translated audio, the language model neural network can refer to the information in the input audio signal. This can enable the translated audio to better reflect the prosody and para-linguistic information, e.g., speaker identity, of the input audio.

In some cases, it can be helpful to specify additional subtasks to generate additional output that can be used for assisting in the carrying out of the desired task. Some subtasks include automatic speech recognition, automatic speech translation, speech to speech translation, text to speech, or text to text machine translation. In some implementations, any task can also be a subtask.

For example, to assist in the task of speech to speech translation, additional subtasks can include automatic speech recognition and automatic speech translation as noted above. The system 100 can carry out automatic speech recognition on the input audio to generate a transcription of the input audio. The system 100 can carry out automatic speech translation to generate a translated text transcription from the input audio and can attend to the generated transcript of the input audio in order to do so. The system 100 can carry out the desired speech to speech translation task and can attend to both the generated transcript of the input audio and the generated translated transcript in order to do so. As noted above, the system performs each subtask in one call. For example, where autoregressive decoding is used, the system 100 can generate each output token one at a time sequentially for the first specified subtask, then the second specified subtask and so on. In this way, in order to generate output for a subsequent subtask, earlier generated output for earlier subtasks can be taken into account.

As another example, to accomplish the task of speech to speech translation, the subtasks can include automatic speech recognition and speech to speech translation. The system 100 can carry out automatic speech recognition on the input audio to generate a transcription of the input audio. The system 100 can carry out the desired speech to speech translation task and can attend to the generated transcript of the input audio in order to do so.

As another example, to accomplish the task of speech to speech translation, the subtasks can include automatic speech translation and speech to speech translation. The system 100 can carry out automatic speech translation to generate a translated text transcription from the input. The system 100 can carry out the desired speech to speech translation task and can attend the generated translated transcript in order to do so.

As another example, to accomplish the task of automatic speech translation, the subtasks can include automatic speech recognition and automatic speech translation. The system 100 can carry out automatic speech recognition on the input audio to generate a transcription of the input audio. The system 100 can carry out the desired automatic speech translation task to generate a translated text transcription from the input audio and can attend to the generated transcript of the input audio in order to do so.

As another example, to accomplish the task of speech to speech translation, the subtasks can include automatic speech recognition, text to text machine translation, and text to speech. To accomplish the task of speech to speech translation, the subtasks can include automatic speech translation, text to text machine translation, and text to speech. To accomplish the task of automatic speech translation, the subtasks can include automatic speech recognition and text to text machine translation. To accomplish the task of automatic speech translation from an input language to a target language, the subtasks can include automatic speech translation from an input language to another language, and text to text machine translation from the other language to the target language. To accomplish the task of text-to-text machine translation, the subtasks can include text to speech, speech to speech translation, and automatic speech translation. To accomplish the task of text-to-text machine translation, the subtasks can include text to speech, speech to speech translation, and automatic speech recognition.

In some examples, the system 100 provides the output 110 for presentation to the user. For example, the system 100 can provide data representing the audio signal 110a to the user device and cause playback of the audio signal 110a. As another example, the system 100 can provide data representing the text 110b for display on the user device.

In some examples, the output 110 can include text, audio, or both, that represents one or more instructions for controlling an agent interacting with an environment. As an example, the instructions can include natural language instructions. For example, the system 100 can receive an audio signal as input that includes speech representing an instruction for controlling the agent in a source language. The system 100 can perform tasks such as speech to speech translation to generate an output that includes speech representing an instruction for controlling the agent in a target language. The system 100 can also perform tasks such as automatic speech translation to generate an output that includes a transcript of the instruction in a target language. The system 100 can also perform tasks such as automatic speech recognition to generate an output that includes a transcript of the instruction in the source language.

As another example, the system 100 can receive text that includes an instruction for controlling the agent in a source language. The system 100 can perform tasks such as machine translation to generate an output that includes text that includes the instruction in a target language. The system 100 can also perform tasks such as text to speech to generate an output that includes speech representing the instruction.

In particular, the natural language instructions can define or otherwise specify a high-level plan that includes a sequence of two or more operations that should be executed by the agent. Generally, the high-level plan defines the operations to be performed by the agent, and the sequential order in which the operations should be performed. Each of these operations can themselves include multiple low-level actions that can be performed by the agent.

In some implementations, the environment is a real-world environment and the agent is a mechanical agent interacting with the real-world environment. For example, the agent may be a robot interacting with the environment to accomplish a goal, e.g., to locate an object of interest in the environment, to move an object of interest to a specified location in the environment, to physically manipulate an object of interest in the environment in a specified way, or to navigate to a specified destination in the environment; or the agent may be an autonomous or semi-autonomous land, air, or sea vehicle navigating through the environment to a specified destination in the environment.

The actions may be control inputs to control a robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Actions may additionally or alternatively include electronic control data such as motor control data, or more generally data for controlling one or more electronic devices within the environment the control of which has an effect on the observed state of the environment. For example in the case of an autonomous or semi-autonomous land, air, or sea vehicle the actions may include actions to control navigation, e.g., steering, and movement, e.g., braking and/or acceleration of the vehicle.

In some implementations the environment is a simulated environment and the agent is implemented as one or more computer programs interacting with the simulated environment. For example, the environment can be a computer simulation of a real-world environment and the agent can be a simulated mechanical agent navigating through the computer simulation.

For example, the simulated environment may be a motion simulation environment, e.g., a driving simulation or a flight simulation, and the agent may be a simulated vehicle navigating through the motion simulation. In these implementations, the actions may be control inputs to control the simulated user or simulated vehicle. As another example, the simulated environment may be a computer simulation of a real-world environment and the agent may be a simulated robot interacting with the computer simulation.

In some implementations, the environment is a suitable execution environment, e.g., a runtime environment or an operating system environment, that is implemented on one or more computing devices such as smart phones, tablet computers, wearable devices, automobile systems, stand-alone personal assistant devices, and so forth, and the agent is a virtual agent (also known as "automated assistant" or "mobile assistant") that may be interacted with by a user through the computing devices. The virtual agent can receive input from the user (e.g., typed or spoken natural language input) and respond with responsive content (e.g., visual and/or audible natural language output). The virtual agent can provide a broad range of functionalities through interactions with various local and/or third-party applications, websites, or other agents. In these implementations, the actions may include any activity or operation that may be performed or initiated by the user on a computing device, e.g., within an application software installed on the computing device.

The components of the system 100 can be trained by a training system that is implemented as one or more computer programs on one or more computers located in one or more locations. In some implementations, the components of the system 100 can be trained independently by the training system. In some implementations, some components of the system 100 can be pre-trained. Training of the system 100 is described in more detail below with reference to FIG. 4.

Figure 2:
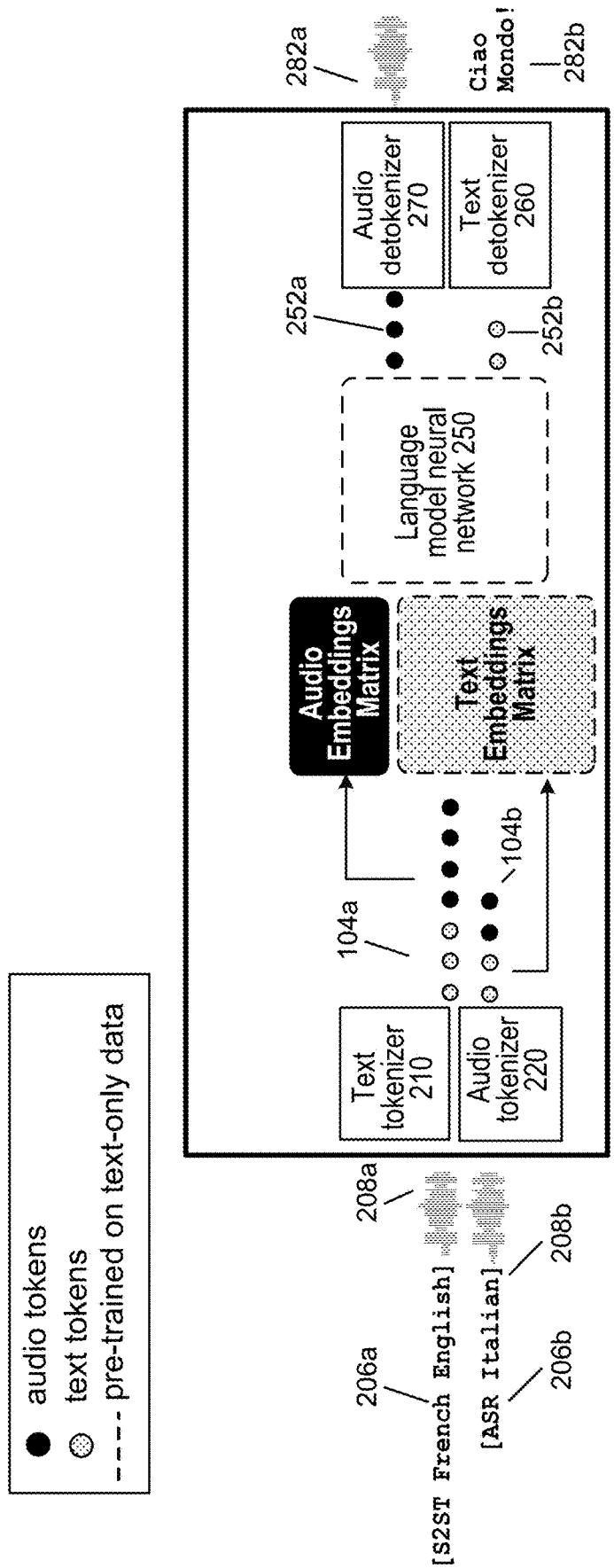
FIG. 2 is a block diagram of another example system for performing tasks that require generating text, generating audio, or both.

FIG. 2 is a block diagram of the example system 100 described with reference to FIG. 1. In particular, the system 100 generates text, audio, or both, given an input of text, audio, or both, using a text tokenizer 210, an audio tokenizer 220, a language model neural network 250, a text detokenizer 260, and an audio detokenizer 270. FIG. 2 shows the example tasks of speech to speech translation from French to English, and the task of automatic speech recognition on Italian speech.

The system generates the sequence of input tokens 104 by tokenizing an input text tag 206 and data 208 for performing the task. In the example of FIG. 2, the system 100 generates the sequence of input tokens 104a for a speech to speech translation task from French to English. The system 100 generates the sequence of input tokens 104b for an automatic speech recognition task in Italian.

For example, the system 100 receives an input text tag 206 that describes the task to be performed. The system can process the input text tag 206 to generate text tokens that describe the task to be performed.

The system can use a text tokenizer 210, described in further detail below, to generate one or more text tokens corresponding to the input text tag 206. The system includes the text tokens corresponding to the input text tag 206 in the sequence of input tokens 104.

For example, the input text tag can include the target language of the output text or audio. As a particular example, the tag can specify the English name of the language of the input and, optionally, the language of the output if it is different. In the example of FIG. 2, the input text tag 206a includes "[S2ST French English]" which describes the type of task, the source language for the task, and the target language for the task. For example, "S2ST" specifies the type of task, speech to speech translation. The source language is French and the target language is English. The system 100 can thus include text tokens corresponding to the input text tag 206a in the sequence of input tokens 104a.

The input text tag 206b includes "[ASR Italian]", which describes the type of task and the source language. For example, "ASR" specifies the type of task, automatic speech recognition. The source language is Italian. The system 100 can thus include text tokens corresponding to the input text tag 206b in the sequence of input tokens 104b.

As other examples, to query the system to perform ASR on an utterance in French, the input text tag can include "[ASR French]". To perform TTS in English, the input text tag can include "[TTS English]". To perform S2ST from English to French, the input text tag can include "[S2ST English French]".

In some examples, the input text tags can include natural language descriptions of the task to be performed. For example, to perform automatic speech recognition on French speech, the input text tag can include "transcribe the following French audio."

In some examples, the tag does not specify the name of the language of the input or output. For example, to perform automatic speech recognition on French speech, the input text tag can include "[ASR]" or "transcribe audio."

In examples with multiple subtasks, the tag can specify the multiple subtasks. For example, to perform speech to speech translation from English to French by performing automatic speech recognition on English audio to generate English text, automatic speech translation on English audio to generate French text, and speech to speech translation on English audio to generate French audio, the input text tag can include "[ASR AST S2ST English French]".

The system 100 also receives one or more sequences of data 208 for performing the task. The system 100 can include tokens corresponding to the sequences of data 208 in the sequence of input tokens 104. The sequences of data 208 can include, for example, a text input or input audio signal.

In the example of FIG. 2, the input audio signal 208a represents speech in French. The system 100 can thus tokenize the input audio signal 208a into audio tokens and include the audio tokens corresponding to the input audio signal 208a in the sequence of input tokens 104a.

The input audio signal 208b represents speech in Italian. The system 100 can thus tokenize the input audio signal 208b into audio tokens and include the audio tokens corresponding to the input audio signal 208b in the sequence of input tokens 104b.

Tokenization refers to the process of mapping a sequence of inputs into tokens that are each selected from a fixed vocabulary of tokens. For example, the vocabulary of tokens can be a vocabulary that is maintained by the system. The vocabulary of tokens can include text tokens that represent text and audio tokens that represent audio.

For example, to generate a sequence of input tokens for a text input, the system 100 can apply a text tokenizer 210 to the text to generate a sequence of text tokens. The system 100 can include the sequence of text tokens in the sequence of input tokens.

The text tokenizer 210 is configured to tokenize text. For example, the system can tokenize the text input and the input text tag 206 that describes the task. The vocabulary of tokens can include any of a variety of tokens that represent text symbols. For example, the vocabulary of tokens can represent one or more of characters, sub-words, words, punctuation marks, numbers, or other symbols that appear in a corpus of natural language text. The SentencePiece tokenizer, which is described in more detail in Kudo, T. and Richardson, J. SentencePiece: A simple and language independent subword tokenizer and detokenizer for neural text processing. In Proceedings of the 2018 Conference on Empirical Methods in Natural Language Processing: System Demonstrations, pp. 66-71, Brussels, Belgium, November 2018a. Association for Computational Linguistics. doi: 10.18653/v1/D18-2012, is an example of a suitable tokenizer in this example.

To generate a sequence of input tokens for an input audio signal, the system 100 can apply an audio tokenizer 220 to the audio signal to generate a sequence of audio tokens. The system 100 can include the sequence of audio tokens in the sequence of input tokens.

In some examples, the audio tokenizer 220 is configured to generate a semantic representation of the input audio signal 208a that includes audio tokens. The audio tokenizer 220 can generate a semantic representation of the audio signal that specifies a respective audio token at each of a plurality of first time steps spanning the audio signal, each audio token being selected from a vocabulary of audio tokens and representing semantic content of the audio signal at the corresponding first time step. Examples of semantic content that can be represented by the tokens include linguistic content for speech and melody and rhythm for music.

The audio tokenizer 220 can generate the semantic representation of the audio signal as described in Borsos et al., AudioLM: a Language Modeling Approach to Audio Generation. arXiv preprint arXIV:2209.03143, 2022. For example, the audio tokenizer 220 can generate the semantic representation by processing the audio signal using an audio representation neural network that has been trained to generate representations of input audio to generate the semantic representation of the audio signal. That is, the audio tokenizer 220 can process the audio signal using the audio representation neural network to generate a respective encoded vector for each of the first time steps. The audio tokenizer 220 can select, for each first time step, as the audio token at the first time step, the audio token that is closest to the encoded vector generated by the audio representation neural network for the first time step.

The target semantic representations for the training of the audio representation neural network can have been generated by clustering the outputs of an intermediate layer of a self-attention based model, e.g., a Transformer-based model or a Conformer-based model, and using the centroids of the clusters as the semantic tokens. For example, the system or a training system of the system can generate a sequence of dense embeddings from an embedding model. For example, the embedding model can be a w2v-BERT model. The system can generate dense embeddings for all of the training data. The system can normalize the embeddings by subtracting the mean and scaling to have unit variance. The system can perform k-means clustering on the normalized embeddings. The system can then compute tokens by assigning a normalized dense embedding to an identifier of the nearest cluster center.

In some implementations, the system does not normalize the embeddings before performing the k-means clustering, e.g., for improved performance on multilingual data.

In some implementations, the w2v-BERT model can be trained on multilingual data.

In some implementations, the system can use a multilingual speech encoder such as a Universal Speech Model (USM) encoder as the embedding model. Given a raw audio input, the USM encoder generates a sequence of integers with length proportional to the length of the audio. As an example, the system can extract embeddings from the middle layer (or any other appropriate layer or combination of layers) of the USM encoder, and quantize the embeddings to compute tokens. For example, the quantizer can be a random-projection quantizer as described in Zhang et al, Google USM: Scaling automatic speech recognition beyond 100 languages. arXiv preprint arXiv:2303.01037, 2023.

The sequence of input tokens 104 thus includes tokens that describe a task to be performed and data for performing the task. Each token in the sequence of input tokens 104 is selected from a vocabulary of tokens that includes text tokens and audio tokens.

The system processes the sequence of input tokens 104 to generate a sequence of embeddings. The system can generate the sequence of embeddings by embedding each token in the sequence of input tokens 104 in an embedding space. For example, the system 100 can maintain a respective embedding for each token in the vocabulary of tokens. For each token in the sequence of input tokens 104, the system can map the token to the respective embedding for the token.

As an example, the language model neural network 250 can be a decoder-only Transformer that includes a token embeddings matrix E with learned values. Generally, the token embeddings matrix E maps each token, e.g., represented as an integer or a one-hot encoded vector, to a corresponding dense embedding. For example, given a vocabulary of t tokens and embeddings of size m, E is a t×m matrix whose ith row gives the embedding for the ith token. The language model neural network 250 also includes another embeddings matrix E' in the final softmax layer used to compute the logits over all tokens at each position. For example, the embeddings matrix E' is a m×t matrix which is multiplied with the m-dimensional output of a last attention layer of the language model neural network 250 to obtain a t dimensional vector of logits, one for each of the tokens. In some examples, the embeddings matrix E' has shared variables with E and is the transpose of E.

To modify the language model neural network 250 to also model audio, the system can use an expanded embeddings matrix. For example, the expanded embeddings matrix can include mappings for text and audio tokens. In the example of FIG. 2, the expanded embeddings matrix is a (t+a)×m matrix, where a is the number of audio tokens. Thus the expanded embeddings matrix maps a vocabulary of t text tokens and a audio tokens to a respective embedding in the embedding space. The system can thus extend the token vocabulary of an existing decoder, and use the new tokens to represent tokenized audio.

At least some of the values can have been learned jointly with the language model neural network 250. The embeddings for any text tokens in the vocabulary can be learned during text-only pre-training of the language model neural network. For example, the system can obtain the embeddings matrix for a vocabulary of t text tokens of a pre-trained language model neural network 250.

The embeddings for any audio tokens in the vocabulary can be learned during audio-text training of the language model neural network. The system can add a new rows to the embeddings matrix to expand the embeddings matrix, and fine-tune the expanded embeddings matrix to learn the embeddings for the audio tokens. As an example, the first t embeddings can correspond to the vocabulary of t text tokens, for example, SentencePiece text tokens. The next a embeddings, from t to t+a, can represent audio tokens.

While the text embeddings can be re-used from the pre-trained language model neural network 250, a training system of the system 100 or another system can randomly initialize and then train the audio embeddings. The system can train the audio embeddings using mixed speech and text tasks as described below with reference to FIG. 4. In some examples, the system can train the audio embeddings and further train, e.g., fine-tune, the text embeddings. In some examples, the embeddings for the text tokens can be held fixed during the audio-text training of the language model neural network.

The system processes the sequence of embeddings using the language model neural network 250 to generate a sequence of output tokens 252 for the task. The sequence of output tokens 252 can include text tokens, audio tokens, or both. By expanding the embeddings matrix to include text embeddings and audio embeddings, the language model neural network 250 can model both text and audio.

In the example of FIG. 2, the language model neural network 250 processes the sequence of input tokens 104a to generate a sequence of output tokens 252a that includes audio tokens. The language model neural network 250 processes the sequence of input tokens 104b to generate a sequence of output tokens 252b that includes text tokens.

For example, the language model neural network 250 can be a modified pretrained text decoder with an expanded embeddings matrix as described above. As an example, the text decoder, hence the language model neural network 250, can have a decoder-only Transformer-based architecture, where the sequence of input tokens 104a is provided as a "prompt" to the language model neural network 250.

In general a Transformer-based architecture can be one which is characterized by having a succession of self-attention neural network layers. A self-attention neural network layer has an attention layer input for each element of the input and is configured to apply an attention mechanism over the attention layer input to generate an attention layer output for each element of the input. There are many different attention mechanisms that may be used.

As a particular example, the language model neural network 250 can generate the sequence of output tokens 252 autoregressively. For example, the language model neural network 250 can generate a sequence of output tokens 252 by generating each particular output token in the sequence 252 conditioned on a current input sequence that includes any output tokens that precede the particular output token in the sequence 252, i.e., the output tokens that have already been generated for any previous positions in the sequence 252 that precede the particular position of the particular output token.

More specifically, to generate a particular output token, the language model neural network 250 can process the current input sequence to generate a score distribution, e.g., a probability distribution, that assigns a respective score, e.g., a respective probability, to each token in the vocabulary of tokens. The language model neural network 250 can then select, as the particular token, a token from the vocabulary using the score distribution. For example, the language model neural network 250 can greedily select the highest-scoring token or can sample, e.g., using top-k sampling, nucleus sampling or another sampling technique, a token from the distribution.

As a particular example, the language model neural network 250 can be an auto-regressive Transformer-based neural network that includes a plurality of layers that each apply a self-attention operation. The language model neural network 250 can have any of a variety of Transformer-based neural network architectures. Examples of such architectures include those described in J. Hoffmann, S. Borgeaud, A. Mensch, E. Buchatskaya, T. Cai, E. Rutherford, D. d. L. Casas, L. A. Hendricks, J. Welbl, A. Clark, et al. Training compute-optimal large language models, arXiv preprint arXiv:2203.15556, 2022; J. W. Rae, S. Borgeaud, T. Cai, K. Millican, J. Hoffmann, H. F. Song, J. Aslanides, S. Henderson, R. Ring, S. Young, E. Rutherford, T. Hennigan, J. Menick, A. Cassirer, R. Powell, G. van den Driessche, L. A. Hendricks, M. Rauh, P. Huang, A. Glaese, J. Welbl, S. Dathathri, S. Huang, J. Uesato, J. Mellor, I. Higgins, A. Creswell, N. McAleese, A. Wu, E. Elsen, S. M. Jayakumar, E. Buchatskaya, D. Budden, E. Sutherland, K. Simonyan, M. Paganini, L. Sifre, L. Martens, X. L. Li, A. Kuncoro, A. Nematzadeh, E. Gribovskaya, D. Donato, A. Lazaridou, A. Mensch, J. Lespiau, M. Tsimpoukelli, N. Grigorev, D. Fritz, T. Sottiaux, M. Pajarskas, T. Pohlen, Z. Gong, D. Toyama, C. de Masson d'Autume, Y. Li, T. Terzi, V. Mikulik, I.

Babuschkin, A. Clark, D. de Las Casas, A. Guy, C. Jones, J. Bradbury, M. Johnson, B. A. Hechtman, L. Weidinger, I. Gabriel, W. S. Isaac, E. Lockhart, S. Osindero, L. Rimell, C. Dyer, O. Vinyals, K. Ayoub, J. Stanway, L. Bennett, D. Hassabis, K. Kavukcuoglu, and G. Irving. Scaling language models: Methods, analysis & insights from training gopher. CoRR, abs/2112.11446, 2021; Colin Raffel, Noam Shazeer, Adam Roberts, Katherine Lee, Sharan Narang, Michael Matena, Yanqi Zhou, Wei Li, and Peter J Liu. Exploring the limits of transfer learning with a unified text-to-text transformer. arXiv preprint arXiv:1910.10683, 2019; Daniel Adiwardana, Minh-Thang Luong, David R. So, Jamie Hall, Noah Fiedel, Romal Thoppilan, Zi Yang, Apoorv Kulshreshtha, Gaurav Nemade, Yifeng Lu, and Quoc V. Le. Towards a human-like open-domain chatbot. CoRR, abs/2001.09977, 2020; and Tom B Brown, Benjamin Mann, Nick Ryder, Melanie Subbiah, Jared Kaplan, Prafulla Dhariwal, Arvind Neelakantan, Pranav Shyam, Girish Sastry, Amanda Askell, et al. Language models are few-shot learners. arXiv preprint arXiv:2005.14165, 2020.

In some examples, the language model neural network 250 can include an attention neural network that includes one or more parallel attention layers. Each parallel attention layer includes an attention sub-layer arranged in parallel with a feed-forward sub-layer. Examples of architectures of the language model neural network 250 are described in more detail in Chowdhery, A., et al. Palm: Scaling language modeling with pathways. arXiv preprint arXiv:2204.02311, 2022, and Anil, R., et al. PaLM 2 Technical Report. arXiv preprint arXiv:2305.10403, 2023.

The system converts the sequence of output tokens 252 output by the language model neural network 250 into an output 282 that satisfies the task. For example, the system can detokenize the sequence of output tokens 252 to generate an output 282 that satisfies the task. The sequence of output tokens 252 can include text tokens, audio tokens, or both. The output can be an audio signal, text, or both.

In the example of FIG. 2, the system 100 detokenizes the sequence of output tokens 252*a* to generate the output 282*a*. The output 282*a* is an audio signal that includes English speech that satisfies the task of speech-to-speech translation from French to English, as specified by the input text tag 206*a*.

In the example of FIG. 2, the system 100 detokenizes the sequence of output tokens 252*b* to generate the output 282*b*. The output 282*b* is text that satisfies the task of automatic speech recognition from Italian speech, as specified by the input text tag 206*b*.

The system 100 can process text tokens to generate a prediction of text. The system can use a text detokenizer 260 to generate the prediction of text from the text tokens. The system can convert text tokens into text using SentencePiece, for example.

The system 100 can use an audio detokenizer 270 to generate the audio from the audio tokens. In some examples, the system can detokenize audio tokens by generating, using one or more neural networks and conditioned on at least the audio tokens, an acoustic representation of an audio signal. The system can process at least the acoustic representation using a decoder neural network to generate a prediction of an audio signal.

The acoustic representation can specify a set of one or more respective acoustic tokens at each of multiple second time steps spanning the audio signal. The one or more respective acoustic tokens at each second time step can represent acoustic properties of the audio signal at the corresponding second time step. Each of the acoustic tokens can be tokens of a neural audio codec, such as the SoundStream neural audio codec. Acoustic properties capture the details of an audio waveform and allow for high-quality synthesis. Acoustic properties can include, for example, recording conditions such as level of reverberation, distortion, and background noise.

In some examples, the system can synthesize an audio signal from audio tokens using autoregressive decoding or non-autoregressive decoding, as described in further detail below with reference to FIG. 3. For example, the system can generate acoustic tokens from the audio tokens autoregressively or non-autoregressively.

In some implementations, the prediction of the audio signal can be conditioned on a voice context that is indicative of or describes a desired voice of the audio signal. The voice context can include a reference input audio signal for the desired voice. In some examples, the input audio signal for the desired voice is converted to or received as a semantic representation, e.g., an audio token at each of multiple first time steps spanning at least part of the audio signal of the desired voice. Each audio token is selected from a vocabulary of audio tokens and represents semantic content of the audio signal at the corresponding first time step. In some examples, the voice context can include an acoustic representation of the input audio signal of the desired voice. For example, the acoustic representation can include one or more acoustic tokens at each of multiple second time steps spanning the audio signal. The one or more respective acoustic tokens at each second time step can represent acoustic properties of the audio signal at the corresponding second time step.

In some implementations where the prediction of the audio signal is conditioned on a voice context that describes a desired voice of the audio signal, the audio tokenizer 220 can generate audio tokens of the sequence of output tokens 252 conditioned on audio tokens for the voice context. In some implementations, the system can generate the acoustic representation conditioned on the audio tokens of the sequence of output tokens 252 and acoustic tokens for the voice context.

In some examples, the input audio signal of the desired voice can be a sample from a sequence of data 208 that is an audio signal that represents speech, such as the input audio signal 208*a* and 208*b*. The system can generate the voice context from the sample. For example, the system can use the audio tokenizer 220 to generate the audio tokens of the voice context.

After generating the acoustic representation, e.g., autoregressively or non-autoregressively, the system processes at least the acoustic representation using a decoder neural network to generate the prediction of the audio signal. For example, the respective audio sample at each of multiple output time steps spanning the time window can be based on one or more acoustic tokens of the acoustic representation.

In some implementations, the decoder neural network can be a decoder neural network of a neural audio codec. For example, the decoder neural network can be a convolutional decoder. The neural audio codec can be a SoundStream neural audio codec, for example.

The neural audio codec can include a decoder neural network and an encoder neural network. For example, the encoder neural network can convert audio into a coded signal which is quantized into an acoustic representation. The decoder neural network can convert the acoustic representation into a predicted audio signal.

In some implementations where the prediction of the audio signal is conditioned on a voice context that describes a desired voice of the audio signal, the system can process the acoustic representation of the audio signal and an acoustic representation of the voice context using the decoder neural network to generate the prediction of the audio signal conditioned on the voice context.

Figure 3:
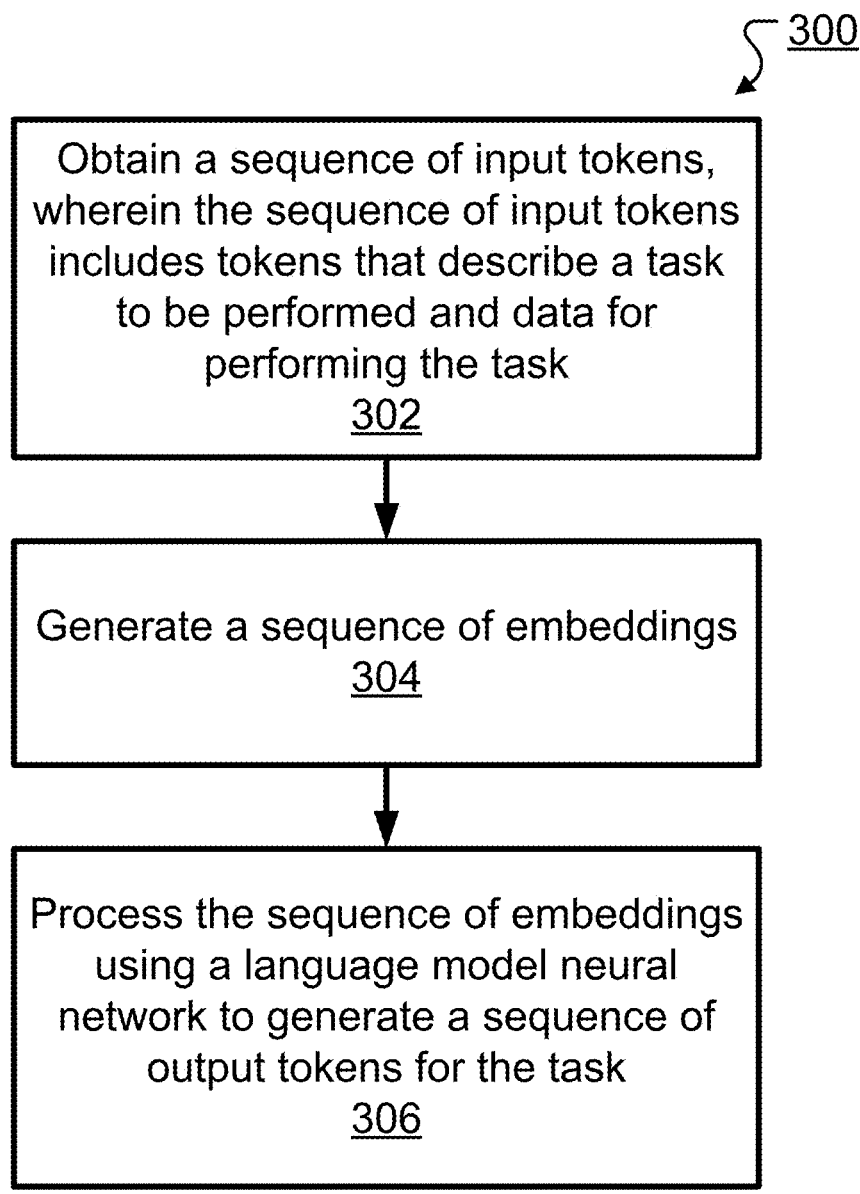
FIG. 3 is a flow diagram of an example process for performing tasks that require generating text, generating audio, or both.

FIG. 3 is a flow diagram of an example process 300 for performing tasks that require generating text, generating audio, or both. For convenience, the process 300 will be described as being performed by a system of one or more computers located in one or more locations. For example, a system for performing tasks, e.g., the system 100 of FIG. 1 and FIG. 2, appropriately programmed in accordance with this specification, can perform the process 300.

The system obtains a sequence of input tokens (step 302). The sequence of input tokens includes tokens that describe a task to be performed and data for performing the task.

In some examples, the system generates the sequence of input tokens by receiving an input text tag that describes the task to be performed, and the data for performing the task. The data for performing the task can include input text, input audio, or both. The system applies tokenization to generate input tokens. For example, the system can use a text tokenizer to tokenize the input text tag and input text into text tokens, and an audio tokenizer to tokenize the input audio into audio tokens.

The system generates a sequence of embeddings (step 304). For example, the system can embed each token in the sequence of input tokens in an embedding space. The system can use an embeddings matrix to generate the sequence of embeddings as described above with reference to FIG. 2.

The system processes the sequence of embeddings using a language model neural network to generate a sequence of output tokens for the task (step 306). The sequence of output tokens can include text tokens, audio tokens, or both.

The system can detokenize the sequence of output tokens to generate an output that satisfies the task. For example, the system can use a text detokenizer to process text tokens to generate a prediction of text. The system can use an audio detokenizer to process audio tokens to generate a prediction of an audio signal. The audio detokenizer can generate acoustic tokens conditioned on the audio tokens, and process the acoustic tokens to generate the prediction of the audio signal. Examples of generating acoustic tokens are described in further detail below.

As an example, the system can generate acoustic tokens from an input sequence of audio tokens autoregressively. For example, the system can generate acoustic tokens for the acoustic representation using a coarse generative neural network and a fine generative neural network. The coarse generative neural network and the fine generative neural network can be trained to predict acoustic representations generated based on outputs of an encoder neural network by processing the audio signal.

For example, the encoder neural network can be a convolutional encoder that maps the audio signal to a sequence of embeddings. Each respective embedding at each of multiple second time steps can correspond to features of the audio signal at the second time step. The ground truth acoustic representation for an audio signal can be generated by applying quantization to each of the respective embeddings. For example, the encoder neural network can be part of a neural audio codec such as a SoundStream neural audio codec. For example, the quantization can be residual vector quantization that encodes each embedding using a hierarchy of multiple vector quantizers that each generate a respective acoustic token from a corresponding vocabulary of acoustic tokens for the vector quantizer.

The set of one or more respective acoustic tokens at each of the multiple second time steps include multiple acoustic tokens that collectively represent a prediction of an output of a residual vector quantization applied to an embedding that represents acoustic properties of the audio signal at the second time step. The residual vector quantization encodes the embedding using a hierarchy of multiple vector quantizers that each generate a respective acoustic token from a corresponding vocabulary of acoustic tokens for the vector quantizer. The hierarchy includes one or more coarse vector quantizers at one or more first positions in the hierarchy and one or more fine vector quantizers at one or more last positions in the hierarchy. The set of acoustic tokens at each second time step thus includes, for each vector quantizer, a respective acoustic token selected from the vocabulary for the vector quantizer.

For example, the hierarchy can include coarse vector quantizers and fine vector quantizers.

To generate the acoustic representation, the coarse generative neural network can generate acoustic tokens for coarse vector quantizers conditioned on at least the semantic representation. For example, the coarse generative neural network can generate, for each of the one or more coarse vector quantizers in the hierarchy, the respective acoustic tokens for the second time steps for the vector quantizer conditioned on at least the semantic representation. The acoustic tokens for coarse vector quantizers can be used to materialize speech, but at a low bitrate. In some implementations where the prediction of the audio signal is conditioned on a voice context that describes a desired voice of the audio signal, the coarse generative neural network can generate acoustic tokens conditioned on the semantic representation and acoustic tokens for the voice context.

The coarse generative neural network can be an auto-regressive neural network that is configured to generate the acoustic tokens for coarse vector quantizers auto-regressively according to a first generation order. In some implementations, the coarse generative neural network has a decoder-only Transformer architecture. In some implementations, the coarse generative neural network has an encoder-decoder Transformer architecture.

To generate the acoustic representation, the fine generative neural network can generate acoustic tokens for fine vector quantizers conditioned on at least the acoustic tokens for coarse vector quantizers. For example, the fine generative neural network can generate, for each of the one or more fine vector quantizers in the hierarchy, the respective acoustic tokens for the second time steps for the vector quantizer conditioned on the respective acoustic tokens for the second time steps for the one or more coarse vector quantizers in the hierarchy. The acoustic tokens for fine vector quantizers can be used to materialize speech at a higher bitrate than the acoustic tokens for the coarse vector quantizers, which improves the quality of the materialized speech.

The fine generative neural network can be an auto-regressive neural network that is configured to generate the acoustic tokens auto-regressively according to a second generation order. In some implementations, the fine generative neural network has a decoder-only Transformer architecture. In some implementations, the fine generative neural network has an encoder-decoder Transformer architecture. Further details are described in Borsos et al., AudioLM: a Language Modeling Approach to Audio Generation. arXiv preprint arXIV:2209.03143, 2022.

In some other examples, the system can generate audio tokens from a sequence of audio tokens using non-autoregressive decoding. The system can use a generative neural network to generate a sequence of acoustic tokens from a sequence of tokens over a plurality of iterations. For example, the system can include a bidirectional attention-based Conformer model that is trained to predict masked acoustic tokens given a conditioning signal such as the audio tokens of the sequence of output tokens. In some implementations where the prediction of the audio signal is conditioned on a voice context that describes a desired voice of the audio signal, the conditioning signal can also include the audio tokens of the voice context. In some examples, the conditioning signal can include acoustic tokens representing the voice context.

Before the first iteration, the system can generate the sequence of tokens from the sequence of output tokens. The sequence of tokens includes a respective token at each of a plurality of positions in the sequence of tokens. The positions generally correspond to time steps spanning a specified time window of the output audio signal. The positions can be partitioned into multiple frames (or segments), where the multiple frames can each include a fixed number of positions.

Each token can include an audio token from the sequence of output tokens, or a masked token. In some examples, each token can include an audio token or acoustic token of the voice context. A "masked token" is a token that includes predetermined numerical values and that signifies that the corresponding token in the sequence of tokens has not been generated, e.g., selected from a predetermined set of tokens, yet.

The system generates the sequence of acoustic tokens by gradually unmasking all of the masked tokens that were originally included in the sequence of tokens. During each iteration, the system performs a forward pass through the generative neural network, i.e., uses the generative neural network to process a network input in accordance with its parameters, to generate an updated sequence of tokens. For the first iteration, the network input includes the sequence of tokens. For any subsequent iteration, the network input includes the updated sequence of tokens that has been generated in the immediately preceding iteration.

Then, at each iteration, the system uses the generative neural network to process the network input to generate one or more new tokens to replace the respective masked tokens in the sequence of tokens. That is, at each iteration, the generative neural network is used to generate an updated sequence of tokens that has fewer masked tokens.

The generative neural network is configured to generate a sequence of embeddings for each token in the network input. The generative neural network can sum the embeddings corresponding to the same frame, including the embedding(s) of the conditioning token(s), i.e., the audio token(s), and provide the continuous embeddings as input to a Conformer model configured to apply bidirectional self-attention using one or more attention blocks.

Each attention block of the Conformer model includes one or more convolutional layers and one or more attention layers. Each attention block may thus be also referred to as a "convolution-augmented attention block." Each attention block processes continuous embeddings, or data derived from the continuous embeddings, to update the continuous embeddings by applying both convolution operations and attention operations to generate updated continuous embeddings.

The system can identify a subset of the sequence of tokens that are eligible to be unmasked at the current iteration. For instance, each token in the sequence of tokens can be associated with a respective vector quantizer at a particular level/position in a sequence of vector quantizers. The system can be configured to unmask the tokens in the input sequence level by level, starting from the first level in the sequence of vector quantizers. Thus, the system can identify the subset of the sequence of tokens that are eligible for unmasking at the current iteration as any masked token in the input sequence of tokens that is associated with the level that is being unmasked at the current iteration.

Specifically, when different positions in the sequence of output tokens are associated with different vector quantizers in a sequence of vector quantizers $1 \ldots Q'$, $(Q'+1) \ldots Q$ included in a neural audio codec (e.g., the Soundstream neural audio codec) that are arranged in a hierarchical order, then for each position in the sequence of tokens that is occupied by a masked token, the system can determine whether to select the position to be unmasked based on the residual vector quantizer associated with the position.

For example, the hierarchical order can be a coarse-to-fine order. That is, the hierarchy can include one or more coarse vector quantizers at one or more first levels in the hierarchy and one or more fine vector quantizers at one or more last levels in the hierarchy.

The generative neural network processes the updated continuous embeddings for each frame to generate a respective prediction characterizing each of the tokens selected to be unmasked. The updated sequence of tokens for the given iteration can then be generated by replacing one or more the masked tokens of the identified subset with the unmasked tokens, i.e., by including the unmasked tokens in place of the masked tokens in the sequence of output tokens. Thus, at the end of the given iteration, the generative neural network can generate an updated sequence of tokens.

After the last iteration, the system uses the updated sequence of tokens that has been generated in the last iteration as the sequence of acoustic tokens. Further details are described in Borsos et al., SoundStorm: Efficient Parallel Audio Generation. arXiv preprint arXiv:2305.09636, 2023.

Throughout this specification, an "embedding" refers to an ordered collection of numerical values, e.g., a vector, matrix, or other tensor of numerical values (e.g., integers or floating point values).

Throughout this specification, a "residual vector quantizer" (RVQ) can refer to a multi-stage vector quantization technique that is based on a sequence of (residual) vector quantizers. A vector quantizer can quantize an input vector, e.g., by identifying a code vector from a codebook of code vectors associated with the vector quantizer, e.g., that has a smallest distance from the input vector, e.g., according to a distance metric (e.g., based on an L1 norm). The residual vector quantizer can quantize an input vector (or "signal") by iteratively quantizing the residual errors from previous quantization stages. Thus each stage in a residual vector quantizer encodes the difference (or residual) between the original signal and the reconstructed signal from the previous stage, thereby progressively refining the approximation of the original signal with each step.

Figure 4:
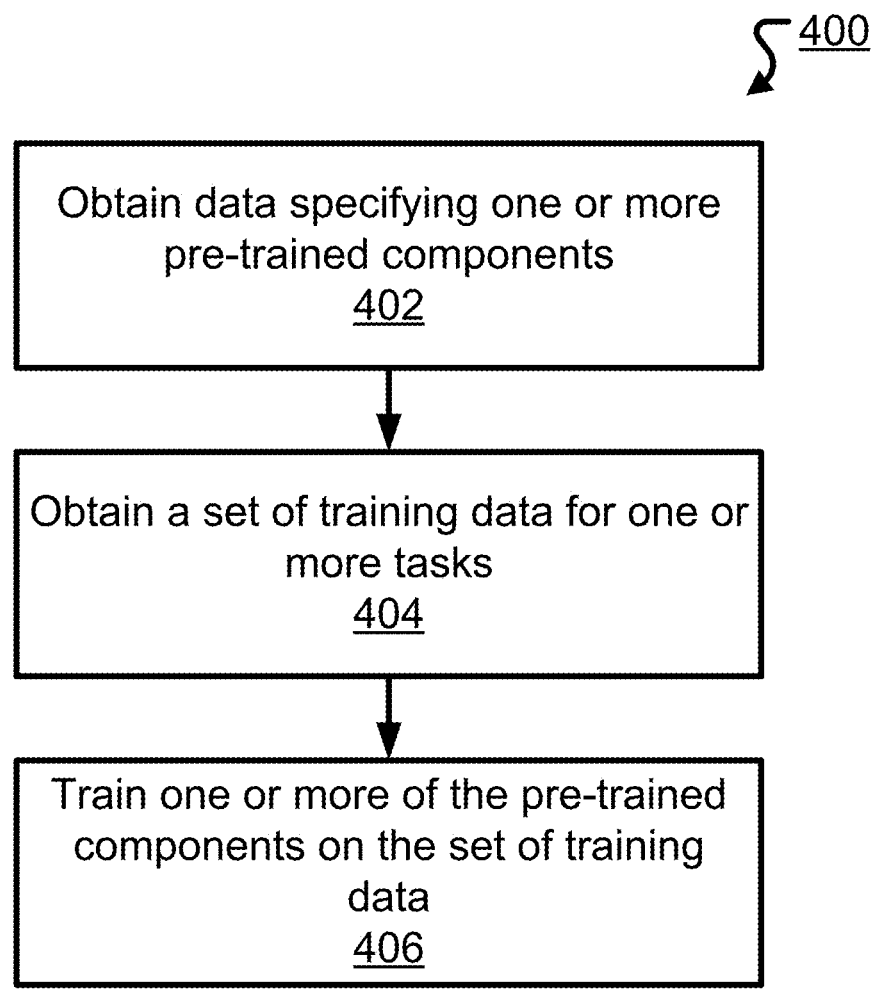
FIG. 4 is a flow diagram of an example process for training a system for performing tasks that require generating text, generating audio, or both.

FIG. 4 is a flow diagram of an example process 400 for training a system for performing tasks that require generating text, generating audio, or both. For convenience, the process 400 will be described as being performed by a system of one or more computers located in one or more locations. For example, a training system of a system for performing tasks, e.g., the system 100 of FIGS. 1-2, or another training system, appropriately programmed in accordance with this specification, can perform the process 400.

The system obtains data specifying one or more pre-trained components of the system (step 402). For example, the system can obtain data specifying a pre-trained text tokenizer, a pre-trained audio tokenizer, a pre-trained language model neural network, a pre-trained text detokenizer, and a pre-trained audio detokenizer.

As an example, the language model neural network can have been pre-trained on a language modeling task, e.g., a task that requires predicting, given a current sequence of text tokens, the next token that follows the current sequence in the training data. As a particular example, the language model neural network can be pre-trained on a maximum-likelihood objective on a large dataset of text, e.g., text that is publicly available from the Internet or another text corpus.

Some example pre-trained language model neural networks are described in Chowdhery, A., et al. Palm: Scaling language modeling with pathways. arXiv preprint arXiv:2204.02311, 2022, and Anil, R., et al. PaLM 2 Technical Report. arXiv preprint arXiv:2305.10403, 2023. In these examples, pre-training the language model neural network can also involve learning the pre-trained values of the embeddings matrix.

As another example, the text tokenizer can have been pre-trained on text tokenization tasks. The text detokenizer can have been pre-trained on text detokenization tasks. Further details for an example text tokenizer and text detokenizer are described in Kudo et al., Sentencepiece: A simple and language independent subword tokenizer and detokenizer for neural text processing. arXiv preprint arXiv:1808.06226, 2018.

The audio tokenizer can have been pre-trained to generate audio tokens, for example, as described in Zhang et al., Google USM: Scaling automatic speech recognition beyond 100 languages. arXiv preprint arXiv:2303.01037, 2023 or Borsos et al., AudioLM: a Language Modeling Approach to Audio Generation. arXiv preprint arXIV:2209.03143, 2022. The audio detokenizer can include a neural network that has been pre-trained to generate acoustic tokens conditioned on audio tokens, for example, as described in Borsos et al., AudioLM: a Language Modeling Approach to Audio Generation. arXiv preprint arXIV:2209.03143, 2022 or Borsos et al., Soundstorm: Efficient parallel audio generation. arXiv preprint arXiv:2305.09636, 2023. The audio detokenizer can also include a decoder neural network that has been pre-trained to generate a prediction of an audio signal from acoustic tokens, for example, as described in Zeghidour et al., SoundStream: An end-to-end neural audio codec. IEEE/ACM Transactions on Audio, Speech, and Language Processing, 30:495-507, 2021.

The system obtains a set of training data for one or more tasks (step 404). The set of training data can include multiple training examples, each including a training input and a ground-truth output. Each training input and ground-truth output can include any of a combination of speech in a source language, a transcript of the speech, the spoken translation of the speech, and the written translation of the speech. In some examples, the spoken translation of the speech has voice properties of the speaker of the speech in the source language.

As described above, the tasks can include automatic speech recognition, automatic speech translation, speech to speech translation, text to speech, and text to text machine translation. For example, for speech to speech translation, the training input includes speech in a source language, and the training output includes a spoken translation of the speech in a target language. In some examples, the training input can include an input text tag specifying the task for the training example.

In some examples, the set of training data can include training examples for a particular task. For example, the set of training data can include training examples for only the automatic speech translation task.

In some other examples, the set of training data can include training examples for multiple tasks. Training the system on multiple tasks results can result in improved performance for the system compared to training the system on one task. For example, training on a set of training data that includes automatic speech recognition training examples and automatic speech translation training examples results in better performance on the automatic speech translation task, compared to training on only automatic speech translation tasks, e.g., by helping the language model neural network connect the audio input to its previous understanding of text. The system can train the model on multiple tasks by expressing the different tasks in the input text tag.

For example, the set of training data can include training examples for automatic speech recognition as well as automatic speech translation. In this example, the system is trained to output text.

As another example, the set of training data can include training examples for automatic speech recognition, automatic speech translation, text to speech, and speech to speech translation tasks. In this example, the system is trained to output text and speech.

In some implementations, the set of training data can include training examples for combined tasks. For example, the training input can include an input text tag identifying subtasks for a task. The training output can include an output for each subtask so that the language model neural network is trained to generate a sequence of output tokens that includes output tokens for each subtask.

In some examples, the training input includes a training conditioning input. For example, the training conditioning input can include a voice context. As a particular example, the voice context can be represented as audio tokens, acoustic tokens, or both. In some examples, the voice context can be derived from the training audio input of the training input. For example, the voice context can include a portion of the training audio input. In some examples where the training audio input is shorter than a threshold length of time, the voice context can include the training audio input multiple times to reach the threshold length of time.

In some examples, the system can generate training examples. For example, the system can use the pre-trained language model neural network to translate transcripts of audio into a source language. The system can use a fine-tuned language model neural network to generate speech from the translated transcripts. The system can include the audio and the generated speech in a training example for the speech to speech translation task.

The system trains one or more of the pre-trained components on the set of training data (step 406). For example, instead of updating the parameters of all of the components, the system only updates the parameters of some of the components and holds the parameters of others of the components fixed during the training. As an example, the system can further train, e.g., fine-tune, the language model neural network (including the embeddings matrix) from the pre-trained parameter values. The system can thus train the language model neural network on the one or more tasks of the training data. In some examples, the parameters of the pre-trained tokenizers and detokenizers can be held fixed during training of the language model neural network.

For example, the system can expand the embeddings matrix to include audio token embeddings. The system can randomly initialize or initialize the audio token embeddings to zero. The audio token embeddings can be learned by further training the language model neural network on an audio-text training dataset described above. In some examples, the embeddings for the text tokens can be finetuned during the audio-text training of the language model neural network. In some examples, the embeddings for the text tokens can be held fixed during the audio-text training of the language model neural network.

The system updates the values for the language model neural network using a machine learning training technique, e.g., a gradient descent with backpropagation training technique that uses a suitable optimizer, e.g., stochastic gradient descent, RMSprop, Adam optimizer, or Adafactor optimizer, to optimize an objective function, e.g., a cross-entropy objective function that is specific to a next token prediction task. In some examples, the system uses loss masking on the training inputs.

The system can then determine, based on computing the gradients of the objective function with respect to the parameters of the language model neural network, one or more updates to the values of the parameters of the language model neural network.

By combining the audio token approach with the language model neural network, the system can combine audio tokens and text into a multimodal set of tokens. The multimodal set of tokens can be used interchangeably as inputs and outputs. The language model neural network can thus model sequences of arbitrary audio and text tokens. For example, text-only language model pretraining can be used to initialize a decoder-only language model neural network that can be finetuned on a mixture of tasks that map freely between speech and text.

FIG. 5 shows the performance of an example system for performing tasks that require generating text, generating audio, or both. For example, FIG. 5 shows a comparison between the qualities of audio signals and text generated by variations of an AudioPaLM system (corresponding to the system for performing tasks that require generating text, generating audio, or both described in this specification) and several other systems. The variants include an AudioPaLM system that uses a pre-trained PaLM language model trained on AST (AudioPaLM 8B AST), an AudioPaLM system that uses a pre-trained PaLM language model trained on S2ST and TTS (AudioPaLM 8B S2ST), an AudioPaLM system that uses a pre-trained PaLM-2 language model trained on AST (AudioPaLM-2 8B AST), and a cascaded system with an AudioPaLM-2 ASR model followed by translation with another AudioPaLM-2 model finetuned only for text-to-text translation (AudioPaLM-2 8B cascaded ASR+transl.).

The other systems include Whisper Large, mSLAM, MAESTRO, USM-M, and Translatotron systems.

The AST BLEU scores represent a measure of quality of automatic speech translation, where a higher score is better. FIG. 5 shows that the system has the highest BLEU score for the automatic speech translation task.

The S2ST ASR-BLEU scores represent a measure of quality of speech to speech translation, where a higher score is better, by comparing a text output generated by providing the audio output of the system to an automatic speech recognition model, with the ground truth target text. FIG. 5 shows that the system has the highest BLEU score for the automatic speech recognition task.

The ASR WER scores represent a measure of quality of automatic speech recognition based on word error rate, where a lower score is better. FIG. 5 shows that the system is competitive for the automatic speech recognition task.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a key vectorboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a Jax framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
obtaining a sequence of input audio tokens for an audio signal representing speech in a first natural language;
generating a sequence of input tokens comprising (i) one or more text tokens that describe a speech to speech translation task to be performed from the first natural language to a target natural language, and (ii) the sequence of input audio tokens;
generating a sequence of embeddings by embedding each token in the sequence of input tokens in an embedding space, comprising, for each token in the sequence of input tokens, mapping the token to a respective embedding for the token;
processing the sequence of embeddings using a language model neural network to autoregressively generate a sequence of output audio tokens for the speech to speech translation task, wherein each output audio token is from a set of tokens that includes text tokens and audio tokens, and wherein the language model neural network autoregressively generates the sequence of output audio tokens by generating each particular output audio token in the sequence of output audio tokens conditioned on a current input sequence that includes the sequence of input tokens and any output audio tokens that precede the particular output audio token in the sequence of output audio tokens; and
detokenizing the sequence of output audio tokens to generate an audio signal that represents speech in the target natural language using a decoder neural network.

2. The method of claim 1, wherein generating a sequence of embeddings by embedding each token in the sequence of input tokens in an embedding space comprises:
maintaining the respective embedding for each token in the set of tokens.

3. The method of claim 1, wherein the embeddings for any text tokens in the set have been learned during text-only pre-training of the language model neural network, wherein the embeddings for any audio tokens in the set have been learned during audio-text training of the language model neural network, and wherein the embeddings for the text tokens are held fixed during the audio-text training of the language model neural network.

4. The method of claim 1, wherein generating a sequence of input tokens comprises:
receiving an input text tag that describes the speech to speech translation task to be performed; and
generating a sequence of input tokens from the input text tag and the audio signal representing speech in the first natural language.

5. The method of claim 4, wherein generating a sequence of input tokens comprises:
including the sequence of input audio tokens in the sequence of input tokens.

6. The method of claim 1, wherein obtaining a sequence of input audio tokens for an audio signal representing speech in a first natural language comprises:
applying an audio tokenizer to the audio signal to generate a sequence of audio tokens; and wherein generating a sequence of input tokens comprises:
including the sequence of audio tokens in the sequence of input tokens.

7. The method of claim 6, wherein applying an audio tokenizer to the audio signal comprises:
generating a semantic representation of the audio signal that specifies a respective audio token at each of a plurality of first time steps spanning the audio signal, each audio token being selected from a vocabulary of audio tokens and representing semantic content of the audio signal at the corresponding first time step.

8. The method of claim 7, wherein generating a semantic representation of the audio signal comprises:
processing the audio signal using an audio representation neural network that has been trained to generate representations of input audio to generate the semantic representation of the audio signal.

9. The method of claim 8, wherein processing the audio signal using an audio representation neural network that has been trained to generate representations of input audio to generate the semantic representation of the audio signal comprises:
processing the audio signal using the audio representation neural network to generate a respective encoded vector for each of the first time steps; and
for each first time step, selecting, as the audio token at the first time step, an audio token from the vocabulary of audio tokens using the encoded vector generated by the audio representation neural network for the first time step.

10. The method of claim 4, wherein generating a sequence of input tokens comprises:
applying a text tokenizer to the input text tag to generate the one or more text tokens; and
including the one or more text tokens in the sequence of input tokens.

11. The method of claim 1, wherein detokenizing the sequence of output audio tokens comprises:
generating, using one or more neural networks and conditioned on at least the sequence of output audio tokens, an acoustic representation of an audio signal, the acoustic representation specifying a set of one or more respective acoustic tokens at each of a plurality of second time steps spanning the audio signal, the one or more respective acoustic tokens at each second time step representing acoustic properties of the audio signal at the corresponding second time step; and
processing at least the acoustic representation using the decoder neural network to generate the audio signal.

12. The method of claim 11, wherein generating the acoustic representation comprises generating the acoustic representation conditioned on the sequence of output audio tokens and a voice context to generate the acoustic representation of the audio signal, and wherein processing at least the acoustic representation using a decoder neural network comprises processing the acoustic representation of the audio signal and an acoustic representation of the voice context using a decoder neural network to generate the audio signal conditioned on the voice context.

13. The method of claim 1, wherein the speech to speech translation task comprises a plurality of subtasks, and wherein an input text tag specifies each of the subtasks, and wherein the sequence of output audio tokens is part of a sequence of output tokens that includes a respective output for each of the subtasks.

14. The method of claim 12, wherein the voice context comprises a respective audio token at each of a plurality of first time steps spanning at least part of an audio signal, each audio token being selected from a vocabulary of audio tokens and representing semantic content of the audio signal at the corresponding first time step.

15. The method of claim 13, wherein a subtask comprises any one of: automatic speech recognition, automatic speech translation, speech to speech translation, text to speech, or text to text machine translation.

16. The method of claim 1, wherein the language model neural network is trained on one or more tasks.

17. A system comprising one or more computers and one or more storage devices storing instructions that are operable, when executed by the one or more computers, to cause the one or more computers to perform operations comprising:
 obtaining a sequence of input audio tokens for an audio signal representing speech in a first natural language;
 generating a sequence of input tokens comprising (i) one or more text tokens that describe a speech to speech translation task to be performed from the first natural language to a target natural language, and (ii) the sequence of input audio tokens;
 generating a sequence of embeddings by embedding each token in the sequence of input tokens in an embedding space, comprising, for each token in the sequence of input tokens, mapping the token to a respective embedding for the token;
 processing the sequence of embeddings using a language model neural network to autoregressively generate a sequence of output audio tokens for the speech to speech translation task, wherein each output audio token is from a set of tokens that includes text tokens and audio tokens, and wherein the language model neural network autoregressively generates the sequence of output audio tokens by generating each particular output audio token in the sequence of output audio tokens conditioned on a current input sequence that includes the sequence of input tokens and any output audio tokens that precede the particular output audio token in the sequence of output audio tokens; and
 detokenizing the sequence of output audio tokens to generate an audio signal that represents speech in the target natural language using a decoder neural network.

18. A non-transitory computer storage medium encoded with instructions that, when executed by one or more computers, cause the one or more computers to perform operations comprising:
 obtaining a sequence of input audio tokens for an audio signal representing speech in a first natural language;
 generating a sequence of input tokens comprising (i) one or more text tokens that describe a speech to speech translation task to be performed from the first natural language to a target natural language, and (ii) the sequence of input audio tokens;
 generating a sequence of embeddings by embedding each token in the sequence of input tokens in an embedding space, comprising, for each token in the sequence of input tokens, mapping the token to a respective embedding for the token;
 processing the sequence of embeddings using a language model neural network to autoregressively generate a sequence of output audio tokens for the speech to speech translation task, wherein each output audio token is from a set of tokens that includes text tokens and audio tokens, and wherein the language model neural network autoregressively generates the sequence of output audio tokens by generating each particular output audio token in the sequence of output audio tokens conditioned on a current input sequence that includes the sequence of input tokens and any output audio tokens that precede the particular output audio token in the sequence of output audio tokens; and
 detokenizing the sequence of output audio tokens to generate an audio signal that represents speech in the target natural language using a decoder neural network.

\* \* \* \* \*